Nov. 3, 1964  V. M. KRAMER ETAL  3,155,757
METHOD OF AND APPARATUS FOR MAKING AND JOINING
SPIRALLY CORRUGATED RUBBER TUBING
Original Filed June 9, 1955  2 Sheets-Sheet 2
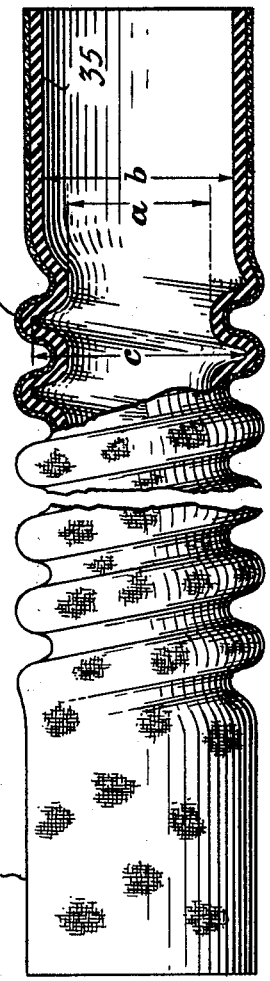
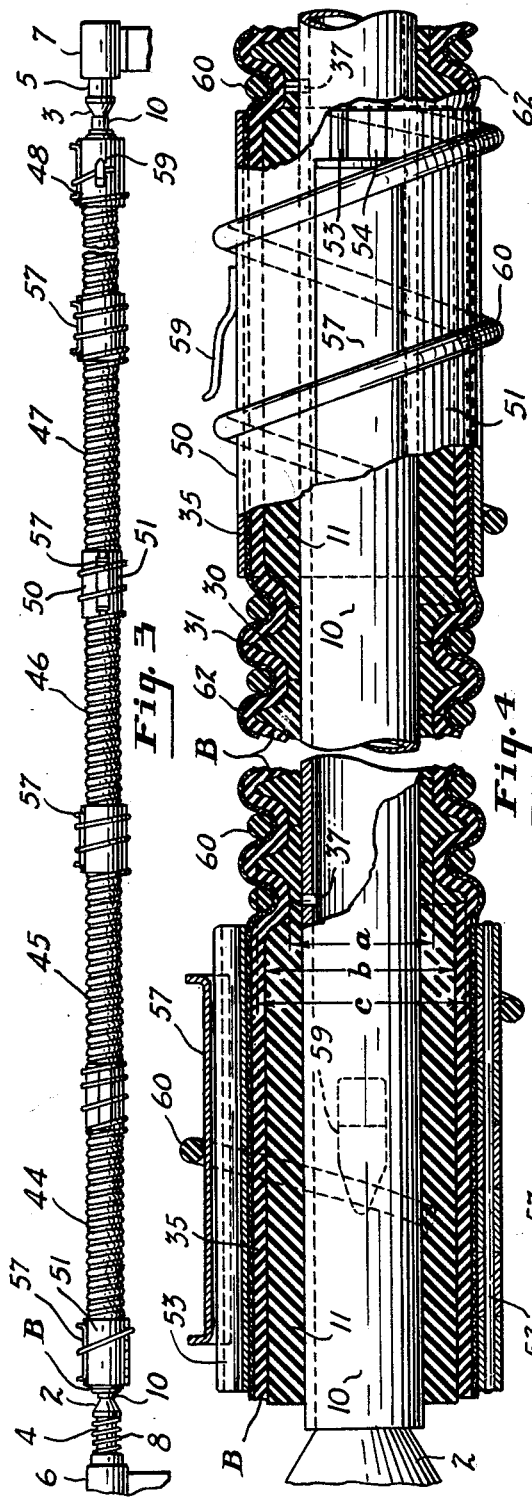
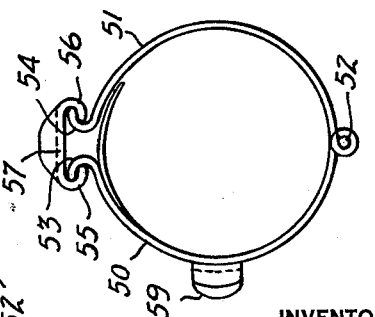
INVENTORS
*Vance M. Kramer*
*Lawrence W. Carlton*
BY *Schramm and Knowles*
ATTORNEYS United States Patent Office 3,155,757
Patented Nov. 3, 1964

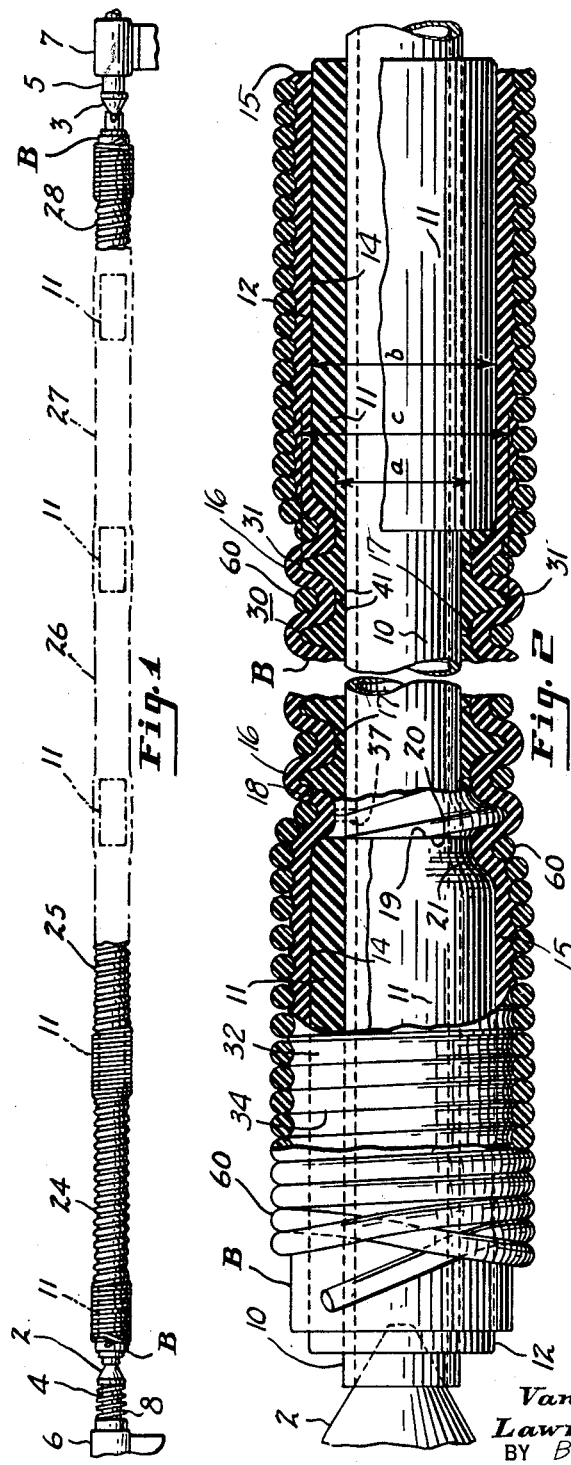

3,155,757
METHOD OF AND APPARATUS FOR MAKING AND JOINING SPIRALLY CORRUGATED RUBBER TUBING
Vance M. Kramer, 402 E. Boundary St., Perrysburg, Ohio, and Lawrence W. Carlton, P. O. Box 146, North Baltimore, Ohio
Original application June 9, 1955, Ser. No. 514,312, now Patent No. 2,909,198, dated Oct. 20, 1959. Divided and this application Oct. 16, 1959, Ser. No. 847,021
11 Claims. (Cl. 264—286)

This invention relates to apparatuses for making and processes for making and joining corrugated flexible rubber tubing. More specifically, the invention is concerned with such apparatuses, and process of making wherein the tubing is provided with a cylindrical end portion which constitutes a connector for attaching the tubing to a cylindrical spigot or pipe.

In many uses of tubing as a fluid conduit it is connected between metal pipes or tubular spigots of cylindrical or other uniform sections. Cylindrically shaped rubber tubing made as by extrusion or by assembly on a cylindrical mandrel is readily attached to cylindrical metal spigots or pipes by effecting telescopic joints. Corrugated rubber tubing, however, can be attached to cylindrical pipe ends or spigots only with some difficulty, especially when it is desired to obtain a fluid tight joint.

Corrugated rubber tubing made by a cording process in which a raw rubber tube blank is conformed to the shape of an internal mandrel by a tensile cord element wrapped spirally about the outside of the assembly presents a particulary difficult problem in connection with the provision of adequate cylindrical end connectors.

It has been proposed to mold cylindrical end portions on corrugated tubes, the cylindrical tube ends being used as connectors that are received telescopically over the metal conduit ends. It has also been proposed to attach a cylindrically shaped rubber tube portion on the end of a corrugated rubber tube by cement or vulcanization to provide a connector that is receivable telescopically over a cylindrical metal conduit end. Molding of cylindrical end connectors on preformed spiral corrugated tubing has been done, but must be accomplished in separate and therefore costly operations. The molding and cementing of cylindrical end portions or connectors thus has not been entirely satisfactory because of the expense involved and the difficulty of obtaining good joints.

It is therefore one of the principal objects of the present invention to provide improved apparatuses and processes for making spirally corrugated rubber tubing having integral cylindrical end portions for attachment of the tubing to cylindrical metal conduit ends as by telescopic joints. More particularly the invention is concerned with processes and apparatuses for making spiral corrugated tubing by cording, integral cylindrical end connectors of the tubing being shaped and cured at the same time as the corrugated section or sections of the tubing.

Another object of the invention is to provide processes and apparatuses for making integral end connectors on rubber tubing, which connectors have smooth cylindrical internal surfaces and charactered external surfaces that facilitate manipulation of the tube end connectors in attaching the tubing to metal pipes and spigots.

Another object is to provide improvements in the cording process of making spirally corrugated tubing so that a plurality of relatively short spirally corrugated tubing sections each having integral cylindrical end connectors can be made simultaneously in end to end relation on a common mandrel or internal form. As a refinement of this aspect of the invention, several corrugated tube sections each with integral end connectors of cylindrical shape are made from a common raw rubber tube blank formed by extrusion in a preliminary operation. The tube blank is drawn axially onto the form or mandrel and the several corrugated tubing sections are corded into place on the mandrel by a single cord or tensile element which is wrapped spirally about the tubing blank from one end to the other of the mandrel, preferably in a single continuous operation. The number of pieces of raw rubber tubing that are handled and the number of cording and decording operations required in the production of short corrugated tubes are thus reduced.

In one version of the process the internal mandrel has a number of sections each comprising spiral corrugations, the corrugated sections being spaced axially from one another and being separated by intervening cylindrical surfaced elements so that a raw rubber tube length received over the form and corded into place is given a spirally corrugated configuration at each of the corrugated sections of the mandrel and is given a cylindrical configuration at each of the cylindrical mandrel portions. The raw rubber tube blank is suitably held against the cylindrical portions of the mandrel by a split sleeve applied externally or, as in the preferred mode of practicing the invention, by wrapping the tensile cord element about the cylindrical portions as well as the corrugated portions of the tube blank, adjacent convolutions of the cord being in close, preferably contacting side by side relation over those portions of the tube blank that constitute the end connectors and are to be shaped into generally cylindrical form.

A still further object is to provide improved connecting techniques and constructions for joining the ends of spirally corrugated rubber tubing.

Other objects and advantages will become apparent from the following detailed description which represents the best known mode of practicing the invention. This description is made in connection with the accompanying drawings forming a part of the specification.

In the drawings:

FIGURE 1 is a fragmentary elevational view partly diagrammatic and with parts broken away and removed of rubber tubing corded in place on an elongated internal mandrel mounted between the supporting end cones of a cording machine;

FIG. 2 is an enlarged foreshortened fragmentary elevational detail partly in section corresponding to part of the left-hand end of FIG. 1 and showing the hollow internal form, spiral core strip sections, cylindrical sleeve sections, tube blank and cord;

FIG. 3 is a fragmentary elevational view similar to FIG. 1 showing a modification of the invention in which the cylindrical end connecting portions of the tubing are confined by separate split sleeves during the curing process;

FIG. 4 is an enlarged fragmentary elevational detail partly in section and with parts broken away and removed of the parts at the left-hand end of FIG. 3;

FIG. 5 is an end view of one of the split sleeves used in the arrangement of FIGS. 3 and 4 and to confine the cylindrical end portions of the tubing; and FIG. 6 is a foreshortened elevational view partly in section and with parts broken away and removed showing spirally corrugated fabric covered tubing with integral cylindrical end connectors as made, say, using the apparatus of FIGS. 3–5.

The present method and apparatus invention is a variation of that set forth in United States patent 2,832,096, dated April 29, 1958. The present application is a division of U.S. application Serial No. 514,312 filed June 9, 1955, now Patent 2,909,198, dated October 20, 1959. Whereas the process of the patent is directed to the formation of a relatively long corrugated rubber tube on an internal form, it being contemplated that a number of tube sections so formed be joined in end to end relation in the provision of a tube or hose of indefinite length, the present invention is concerned with the formation of a rubber tube on a mandrel or internal form that shapes not only one or more spirally corrugated sections or portions of the tube but also one or more end attaching portions of generally cylindrical shape for use in attaching the corrugated section or sections of the tube or hose to a cylindrical spigot of the engine, machine or device with which the tube is to be used.

In a specialized version of the invention a series of corrugated tubing portions and generally cylindrical tubular end connecting portions are formed in alternating end to end relation on a common internal form or mandrel. After curing, the relatively long composite tube so formed is cut or divided into a plurality of relatively short tubes. The division is effected by cutting transversely through the center of each of the cylindrical tube portions so that the resulting separated tube sections each comprises a corrugated center or body portion and integrally connected cylindrical end portions. The latter are useful in attaching the corrugated tube sections to cylindrical spigots in use, say, as radiator hoses of automobiles.

In FIG. 1 is shown such an elongated corrugated rubber tube of alternating corrugated and cylindrical sections, this tube being corded in place on the internal mandrel or form on which it is shaped and cured. The building up of the mandrel, the drawing thereover of the extruded cylindrically shaped raw rubber tube blank and the cording of the blank to form the corrugations follows generally the procedure and utilizes the apparatus described in the co-pending application referred to, with certain variations and changes apparent to those skilled in the art or set forth herein. Referring to FIG. 1 the tube-mandrel assembly is shown mounted, say, between the supporting cones 2 and 3 which correspond to the cones of the cording apparatus illustrated in FIG. 1 of the co-pending case. Thus FIG. 1 may be taken to represent the completion of the cording operation in which the cord 60 has been wrapped spirally about the tube blank with the latter supported internally on the composite form or mandrel. The arrangement of the mandrel is shown more particularly in FIG. 2 which represents a relatively enlarged view of the assembly of FIG. 1 with parts broken away and in section to illustrate the internal construction.

The mandrel comprises an elongated main support member 10 which takes the form of a circular sectioned steel tube into the ends of which are received the supporting cones 2 and 3 of the cording machine. One of the cones, say the right-hand cone of FIG. 1, is power driven, as shown in the patent application referred to, and has a driving connection with the end of the mandrel tube 10 so as to rotate the latter in either forward or reverse direction at the will and under the control of the operator and at variable speed, also under control of the operator.

Extruded rubber core strips 30 are wrapped spirally about and cemented in place on axially spaced portions of the mandrel tube 10. These core strips correspond to the core strip 30 of the patent application mentioned and are alike in shape, height and manner of placement. They provide the desired corrugated surfaces about which is drawn an extruded raw or partially cured tubular blank B ready to be shaped to the desired corrugated configuration in a manner similar to that described in the patent application referred to. At points spaced along the length of the supporting tube 10 where the core strip 30 is omitted, and in lieu thereof, there is employed a series of filler members 11 which may comprise extruded rubber tubes or sleeves that are received over the ends of the tube 10 in assembly and are slid axially into place. The sleeve members 11 are molded so that in their unstressed condition their internal diameter is slightly less than that of the supporting tube 10. Thus in assembling the sleeve members onto the tube 10 the sleeves are slightly distended and frictionally grip the metal tube. Additionally the tube surface or the internal surfaces of the sleeves, or both such surfaces may be treated with a suitable adhesive agent or cement for bonding the sleeves in place.

Each spacer sleeve 11 has an external cylindrical surface 12 which, when the spacer tube member is mounted on the mandrel tube 10, is of less diameter (diameter $b$) than the cylinder (of diameter $c$) generated by crests 31 of the spiral core strips 30. The diameter of the cylindrical surfaces 12 of the spacer sleeves is, however, greater than the cylinder (diameter $a$) generated by the outside surfaces of the core strip flanges 41. Thus when the tube blank B is corded into place about the composite mandrel or form and cured, internal cylindrical surfaces 14 of tube connector portions 15, which are integrally joined to corrugated tube portions 16, are of an intermediate diameter. That is to say, the internal cylindrical surfaces 14 of the tubing connector ends are of greater diameter $b$ than the cylinder (diameter $a$) generated by tubing internal surface portions 17 that define the minimum passage through the tubing, while yet being of less diameter than the cylinder (diameter $c$) generated by bottom 18 of the internal spiral groove which defines the corrugations. This relationship of the internal diameter of the end connectors to the diameters of the cylinders generated by the minimum diameter surface portions 17 and the groove bottoms 18 provides an efficient construction particularly adapted to automotive radiator hoses. The effective clear flow minimum passage diameter through the corrugated portion or section of the tubing is the diameter of the cylinder generated by the internal surface portions 17. In practice this diameter is made approximately ¼ inch less than the diameter of the internal cylindrical surfaces 14 of the end connector portions 15, so that when the latter are received over a cylindrical metal spigot of an engine water pump housing or the like having a wall thickness of approximately ⅛ inch, the clear flow passage through the corrugated portion of the housing is approximately equal to the area of the fluid passage in the spigot.

The ends of each section of the spiral core strip 30 are tapered or skived in the provision of radial end faces normal to the mandrel axis to form smooth junctures with radial end faces 19 of the cylindrical core sleeves 11. Thus each end of each core strip 30 is formed with a surface 20 which is diagonal to the centerline of the strip and is received flatwise against one of the tube end surfaces 19, the meeting surfaces being in a radial plane through the mandrel. Cement and filler material are used in assembly to secure the parts together and to fill any cracks or voids in the provision of a smooth juncture between the parts. Portions of the shoulders at the ends of the core sleeves 11 are removed as by abrading or carving to blend the external cylindrical surfaces of the core sleeves gradually into the corrugated external contours provided by the core strips 30. The contoured end portions of the sleeves 11 are indicated at 21 of FIG. 2.

In the arrangement shown in FIG. 1 by way of example the internal core or mandrel is approximately 6 feet long and is provided with five corrugating sections 24–28, each defined by one of the spirally wound core strips 30. At the ends of the mandrel and between each of the spirally wound core strip sections one of the cylindrical core sleeves 11 is located, there being six of the latter. Thus the single mandrel produces five lengths of flexible corrugated radiator hose integrally joined together by cylindrical tubing portions which overlie and are cured on the core sleeves 11.

In thus making short length connector tubes such as radiator hoses in multiple with the several individual corrugated lengths or sections integrally joined by the substantially cylindrical connector portions, the composite mandrel, constructed as described, is supported at one end cantilever fashion and a raw rubber tube blank B is drawn thereover in the manner described in the copending application referred to. A suitable lubricant such as a silicone liquid or soapstone is used on the external surfaces of the mandrel or form or on the interior of the tubing or on both the mandrel exterior and the tube blank interior. The telescopic movement of the tube blank B onto the lubricated form is facilitated by inflating the tube blank as by air admitted under pressure through either the interior of the mandrel or the end of the tubing blank remote from the mandrel. Such remote end is sealed as by pinching together so as to contain the inflating air.

After the tube blank has been assembled onto the composite internal form or mandrel the latter is supported between the end cones 2 and 3 for the cording operation. The cording is accomplished by wrapping the relatively inextensible rubber covered cord 60 spirally about the form while the latter rotates. Before rotating the mandrel in a cording operation the initial cord end is tied in place about the mandrel at one end of the latter, as shown in FIG. 2, or the cord is otherwise suitably secured as by binding it in place with pressure sensitive tape. Care is taken to place the succeeding convolutions that embrace or extend about each of the cylindrical core sleeves 11 closely adjacent one another, as shown to advantage in FIG. 2.

While the adjacent convolutions or turns of the cord 60 are closely spaced and preferably touch one another over and throughout the length of each of the cylindrical core sleeves 11, as shown in FIG. 2, care is taken in wrapping the cord about each of the spiral or corrugated sections to be sure that the cord follows the spiral contour of the internal core strip 30, the cord being laid into the continuous groove or channel defined by crests 31 of the adjacent core strip convolutions. Thus while several axially spaced cylindrical end connector portions 15 of the tubing are completely covered, or substantially so, the intervening portions of the outer surface of the tube blank B are largely exposed along those sections of the mandrel or form defined by the spirally wound core strips 30.

Upon completion of the cording operation the finish or trail end of the cord is either tied or taped in place so that the tightly wound cord does not shift or become unwound during the subsequent curing operation in open steam in an autoclave or other conventional vulcanizing equipment.

In the curing of the tubing the tightly wound cord 60 maintains compressive radial forces on the cylindrical connector portions 15 and in effect forms an external mold which confines the rubber during curing. The softening of the rubber tube blank B in the curing heat causes the rubber to flow into and take the shape of the shallow spiral groove formed between the adjacent convolutions of the circular sectioned cord 60. The curing of the rubber while thus confined by the spirally wound cord results in the formation of an external corrugated surface, shown at 32 along the entire length of each of the end connector tubing portions 15.

For the purpose of maintaining elasticity in the cord 60 during the curing process, the latter comprises rubber covered fibrous tensile elements which have high resistance to the curing heat. The tensile elements within the cord are preferably glass fibers twisted or otherwise processed into a suitable cord or rope, or they may be hemp, cotton or rayon. The fibrous core of the cord is covered with a rubber sheath as by drawing the cord through a tubing die concurrently with the extrusion of a suitable rubber compound through the die orifice. The cord 60 is subjected to a curing process in a preliminary operation so that the rubber cover of the cord is completely cured before it is employed in the cording of the raw rubber tube blank B.

After the curing of the corded tube blank B in the open steam autoclave it is cooled before the cord is unwrapped for reuse. The cooling is accomplished by allowing it to remain in the atmosphere of the shop while the internal mandrel is supported at its ends. If desired, the cooling may be accelerated by blowing room or refrigerated air or spraying water over the corded-tube-mandrel combination.

After the cured tube has been cooled and the cord 60 removed as by unwrapping, the cured tube blank is withdrawn axially off the internal mandrel or form. The introduction of air under pressure between the tube and the mandrel or form facilitates this withdrawal process. The several sections 24-28 of corrugated tubing are severed from one another as by cutting radially through the midpoints of each of the connector tube portions 15. The cutting of full length tubing into its constituent sections thus is preferably done after the tubing is removed from the internal mandrel since the removal is difficult unless the tubing is inflated in place to permit the corrugations to clear the ridges 31 of the core strips 30.

In forming the generally cylindrical end connectors 15 integrally on the corrugated tubing sections there is eliminated the costly secondary processing heretofore required in attaching or molding end connectors onto sections of spiral tubing cut from a longer piece. The use of the spacer sleeves 11 that are slidable along the mandrel tube 10 in assembly permits internal diameter $b$ of the cylindrical end connectors to be chosen to fit the particular requirements of the application for which the tubing is being produced. Some of the sleeves 11 may be of different lengths and different diameters than others of the sleeves so that the end connectors 15 are of different lengths and diameter. In the preferred arrangement, however, and as mentioned previously, the internal diameter $b$ of the cylindrical end connector is intermediate the diameter $c$ which represents the diameter of the cylinder generated by the crests or ridges 31 of the spiral core strips 30 and the diameter $a$ which represents the diameter of the "clear flow" cylinder generated by those internal surface portions of the corrugated section of the tubing which are closest to the tubing axis.

The external surface 32 of the tubing end connectors 15 is characterized by relatively shallow spiral ridges or crests 34 which are formed by the flow of the soft rubber into the spiral cracks between the adjacent convolutions of the cord 60. The ridges 34 provide a charactered surface on each connector portion which facilitates the manual gripping required in working the tube end connectors into place over the metal pipe connectors or spigots. Internal cylindrical surfaces of the connectors 15 are smooth for sliding over and sealing against the pipe connectors.

In FIGS. 3-6 is illustrated a modification of the invention in which integral cylindrical end connectors 35 are formed on each of corrugated sections 44-48, the latter corresponding to the corrugated sections 24-28 of FIG. 1. The cylindrical connectors 35 are confined during curing by sheet metal split sleeves. Each sleeve comprises semi-cylindrical halves 50 and 51 hinged together by full length pin 52 which parallels the axis of the sleeve. The longitudinal edges of the sleeve halves opposite the hinge pin 52 are formed with outwardly curved reverse bends 53 and 54 which are parallel to and opposite one another. The sleeve half edges are slidingly received in edge channels 55 and 56 of a clamping strip 57 which draws the sleeve closely about the rubber tube blank and is frictionally held in place. In applying the tensile cord 60 about the tube blank B supported on the internal form in the cording operation, the wrapping of the cord about the tube body sections 44-48 that are to be spirally corrugated is accomplished in the regular manner. Between adjacent spiral sections the cord 60 is wrapped about one of the split sleeves 50, 51 which prevents the cord from contacting and deforming the end connector portions 35 of the tubing blank that are received over the internal cylindrical core sleeves 11. The metal sleeve halves 50 and 51, or at least one of the halves on each of the endmost sleeves, is formed with or has attached thereto by welding or riveting a spring metal clip 59 under which the cord 60 is received. The cord 60 is thus gripped and held fast at each end between the body of the spring clip 59 and the external surface of the metal sleeve to hold the cord tensioned in position and to prevent unwinding of the cord during the curing operation.

The tubing shown in FIGS. 3–6 is made with a protective covering 62 of woven or braided textile material. This covering may be a diagonally woven cotton, rayon, or nylon sheath or tube which is drawn axially over and distributed along the length of the raw rubber tube blank B after the latter has been placed on the mandrel and before the cording operation. The tube blank B may be treated with an adhesive agent such as a vulcanizable rubber cement before the fabric sheath is drawn into place so that in the ensuing curing or vulcanizing process the fabric sheath 62 is bonded to and is continuous with the external surface of the rubber body of the tubing throughout the length of the latter, that is along both the corrugated sections 44–48 and the cylindrical end connectors 35. The fabric sheath is held strongly against the rubber tube surface during the curing. In the valleys of the corrugations the cord 60 directly engages the fabric to embed the latter in the rubber body, while over the crests of the corrugation ridges the fabric is held against the rubber by the tensioning of the fabric which results from the cording operation.

After the curing operation the cord 60 is unwrapped from about the tube and mandrel, the clamping strips 57 are withdrawn axially from the halves 50, 51 of the sheet metal split sleeves and the latter removed from about the cylindrical tubing end connectors 35. By the use of internal air pressure the composite full length tube is removed from the internal supporting mandrel, the fabric covering or sheath 62 being sufficiently expansible by reason of its diagonal weaving pattern to permit distension of the tubing to clear the ridges 31 of the core strips 30.

During the cording operation the drawing of the raw rubber tube blank into the channels or grooves between the core strip ridges 31 has the effect of forcing air trapped within the tube blank to migrate axially in the same direction as the progression of the cording operation. Since the raw rubber tube blank B may closely surround the cylindrical core sleeves 11 and trap the air, ballooning of the tube blank B may results unless such trapped air is released. Escape of the trapped air is provided for by radial vent openings 37 which are drilled through the wall of the steel tube support member 10 of the mandrel and also through the core strip 30. In this manner objectionable ballooning of the raw rubber tube as the cording process reaches the end of each of the corrugated sections 44–48 is avoided and the tube blank is made to conform closely to the corrugated shape of each of the spirally wound core strips 30.

The fabric sheath 62 may comprise braided stockinet material which, because of its diagonal or bias weave provides a reinforced corrugated rubber tube in which the braided fabric reinforcement closely follows the contours of the corrugations along each of the sections 44–48. This feature of construction is achieved by taking advantage of the radial forces imparted to the tubing by the wound cord 60. Since the braided fabric tubing material or stockinet 62 is drawn over the raw rubber tube blank B before the cording operation and before the sheet metal sleeves 50, 51 are placed, if the latter be used, it is apparent that the winding of the cord 60 about the tubing to force the latter into the grooves between the convolutions of the core strips 30 along the corrugated section 44–48 concurrently forces the braided fabric sheath or tubing 62 strongly against the rubber surface of the tubing blank along the bottom of the spiral corrugation. The bias woven or braided fabric material is thus tensioned into place, being drawn tightly across the crest portions of the tubing corrugations which extend along the core strip ridges 31. By thus holding the woven fabric material strongly against the cemented surface of the tube blank B during the vulcanizing operation a strong bond is obtained which retains the union between the rubber and fabric after the cured tubing has been cooled and the cord 60 unwound.

The present invention thus provides a new and improved process and apparatus for making corrugated rubber tubing having in combination a central corrugated section and an integral generally cylindrical tubular end connector section.

In accordance with the patent statutes the principles of the present invention may be utilized in various ways, numerous modifications and alterations being contemplated, substitution of parts and changes in construction being resorted to as desired, it being understood that the apparatuses, tubing and tubing joint embodiments shown in the drawings and described above and the particular processes, methods and combinations set forth are given merely for purposes of explanation and illustration without intending to limit the scope of the claims to the specific details disclosed.

What we claim and desire to secure by Letters Patent of the United States is:

1. In the process of making corrugated tubing on an elongated internal form having spirally corrugated and smoooth surfaced portions the combination of steps which comprises telescoping a tube blank onto the form to support one portion of the blank by and on the corrugated portion of the form and to support another portion of the blank by and on the smooth portion of the form, wrapping a flexible element spirally about the one portion of the telescoped blank under tension with successive turns of the element in spaced generally parallel relation and in the corrugations of the corrugated portion to draw said one portion of the blank into the corrugations of the form, embracing and confining the other portion of the blank substantially throughout its axial extent to hold it against the smooth portion of the form, and heat treating the blank while said one portion thereof is wrapped and while said other portion thereof is embraced and confined.

2. In the process of making corrugated tubing as defined in claim 1 wrapping and tensioning the flexible element spirally about said other portion of the blank on the smooth portion of the form with adjacent turns of the element disposed in side by side contacting relation throughout substantially the entire axial extent of said other portion of the blank to effect said embracing and confining of the latter.

3. Apparatus for making corrugated rubber tubes with cylindrical end attaching portions, said apparatus comprising in combination an internal form which includes an elongated cylindrically surfaced support member and, mounted on and substantially completely covering the support member, an alternating series of several corrugated and several cylindrical rubber sections disposed and rigidly held together in end to end coaxial relation and adapted to receive telescopically a substantially cylindrically shaped uncured rubber tube blank, and an inextensible flexible tensile element adapted to be wrapped about the form over a received tube blank to hold the latter against the form during curing.

4. Apparatus for making corrugated rubber tubes with cylindrical end attaching portions, said apparatus comprising in combination an internal form which includes an elongated cylindrically surfaced support member and, mounted on and substantially completely covering the support member, a corrugated rubber section and a cylindrical rubber section, the corrugated section having a surface in the form of a continuous spiral groove and a continuous spiral crest respectively generating concentric cylindrical surfaces of different diameters, the sections being disposed and rigidly held together in end to end coaxial relation and adapted to receive telescopically a substantially cylindrically shaped uncured rubber tube blank, and an inextensible flexible tensile element adapted to be wrapped about the form over a received tube blank to hold the latter against the form during curing.

5. Apparatus for making corrugated rubber tubes with cylindrical end attaching portions, said apparatus comprising in combination an internal form made up of corrugated and cylindrical sections, the corrugated section having a surface in the form of a continuous spiral groove and a continuous spiral crest, the sections being disposed and rigidly held together in end to end coaxial relation and adapted to receive telescopically a substantially cylindrically shaped uncured rubber tube blank, a sleeve of relatively movable rigid parts having cylindrically curved internal surfaces, said sleeve being adapted to be mounted on and wholly supported by a rubber tube blank received about the cylindrical form section and to embrace and clamp the tube blank between the cylindrical form section and the sleeve during curing, said sleeve being short axially relative to the overall length of the internal form, and an inextensible flexible tensile element adapted to be wrapped about the form over a received tube blank to hold the latter against the form during curing.

6. A form for use in the manufacture of a corrugated rubber tube with an integral end attaching portion by supporting and shaping a tubular rubber blank of uniform section on such form, said form comprising an elongated rigid metal mandrel having a cylindrical surface, a first element of resilient deformable material supported by the mandrel and in engagement with one portion of the cylindrical surface about the entire circumference of the latter, said element comprising ridge means providing a corrugated surface of crests and valleys alternating lengthwise along the mandrel, and a second element of resilient deformable material separate from said first element and supported by the mandrel in engagement with another portion of the cylindrical surface about the entire circumference of the latter, said second element comprising sleeve means disposed in end to end relation to the first element and having a relatively smooth surface for engagement with the tubular blank, said first and second elements constituting means substantially completely covering and insulating the mandrel surface throughout the effective working length of the form from such a supported tubular blank.

7. A form for use in making a corrugated rubber tube as claimed in claim 6 in which the first and second resilient deformable elements both embrace the mandrel and constitute a covering sheath adapted to be received within the tube blank and embraced thereby.

8. A form for use in making a corrugated rubber tube as claimed in claim 6 in which the first and second resilient deformable elements are each formed with a radial end face, the end faces being complemental and abutted one against the other.

9. A form for use in making a corrugated rubber tube as claimed in claim 7 in which the first element is a strip of substantially uniform section wrapped spirally about the mandrel and the second element is a tubular sleeve.

10. A form for use in making a corrugated rubber tube as claimed in claim 8 in which the second element is a tubular sleeve and the first element is a strip wrapped spirally about the mandrel with one of its end turns tapered in axial thickness and formed with one of the abutting end faces.

11. A form for use in making a corrugated rubber tube as claimed in claim 6 in which the second element has a cylindrical surface for engagement by the tubing blank and in which the crests of the ridge means define a cylinder of greater diameter than said surface of the second element.

References Cited in the file of this patent

UNITED STATES PATENTS

| | | |
|---|---|---|
| 1,280,170 | Crawford | Oct. 1, 1918 |
| 1,797,193 | Kimmich | Mar. 17, 1931 |
| 2,009,075 | Thompson | July 22, 1935 |
| 2,364,332 | Wilkinson | Dec. 5, 1944 |
| 2,384,056 | Tritt | Sept. 4, 1945 |
| 2,430,081 | Roberts et al. | Nov. 4, 1947 |
| 2,510,840 | Stowe | June 6, 1950 |
| 2,539,853 | Meyers et al. | Jan. 30, 1951 |
| 2,570,259 | McKinley | Oct. 9, 1951 |
| 2,699,182 | Baldridge | Jan. 11, 1955 |
| 2,743,759 | Snow et al. | May 1, 1956 |
| 2,751,237 | Conley | June 19, 1956 |
| 2,832,096 | Kramer et al. | Apr. 29, 1958 |
| 2,899,216 | Brock | Aug. 11, 1959 |
| 2,903,744 | Harrison et al. | Sept. 15, 1959 |
| 2,918,314 | Kemnitz | Dec. 22, 1959 |